US00H002180H

(19) United States

(12) Statutory Invention Registration

Brininstool

(10) Reg. No.: US H2180 H

(43) Published: Feb. 6, 2007

(54) COILED OPTICAL BRAGG RADIATING APERTURE SYSTEM

(75) Inventor: Michael R. Brininstool, 6131 Waverly Ave., La Jolla, CA (US) 92037-6742

(73) Assignee: Michael R. Brininstool, La Jolla, CA (US)

(21) Appl. No.: 10/806,616

(22) Filed: Mar. 23, 2004

(51) Int. Cl.
*G02B 6/26* (2006.01)

(52) U.S. Cl. ..... 385/37

(58) Field of Classification Search ..... 385/37; 398/83–85

See application file for complete search history.

(56) References Cited

U.S. PATENT DOCUMENTS

| | | | | |
|---|---|---|---|---|
| 4,440,468 | A | | 4/1984 | Auracher et al. |
| 5,061,032 | A | * | 10/1991 | Meltz et al. ..... 385/37 |
| 6,016,375 | A | * | 1/2000 | Hill et al. ..... 385/37 |
| 6,137,570 | A | * | 10/2000 | Chuang et al. ..... 356/237.5 |
| 6,854,327 | B2 | * | 2/2005 | Rambow et al. ..... 73/250 |
| 2003/0012499 | A1 | * | 1/2003 | Mendez et al. ..... 385/37 |
| 2003/0161636 | A1 | * | 8/2003 | Ohta et al. ..... 398/166 |
| 2004/0056183 | A1 | * | 3/2004 | Eggleton et al. ..... 250/227.23 |
| 2005/0129072 | A1 | * | 6/2005 | Tayebati et al. ..... 372/9 |

OTHER PUBLICATIONS

Wang, Wilson, Muller, Marker, Psaltis, Liquid–crystal blazed–grating beam deflector, Dec. 10, 2000, vol. 39, No. 35 Applied Optics. pp. 6545–6555.

* cited by examiner

*Primary Examiner*—Dan Pihulic

(74) *Attorney, Agent, or Firm*—Peter A. Lipovsky; Michael A. Kagan; Allan Y. Lee

(57) ABSTRACT

Disclosed is an optical beam steering system having a plurality of optical apertures arranged in a circle. Each of the optical apertures corresponds to a unique angular sector of the circle and includes a blazed fiber Bragg grating that responds to selected wavelengths of light. A particular angular sector of the optical system can selectively be made to project a radially directed light beam based upon the light used. The direction of the light projecting from a chosen angular sector can be altered by further tuning the light and can also be changed by expanding or contracting the length of the blazed fiber Bragg grating employed.

17 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Cross section of BOA 12

Cross section of BOA 12

COILED OPTICAL BRAGG RADIATING APERTURE SYSTEM

BACKGROUND

Certain current techniques for optical beam steering use moving mirrors (gimbal or MEMs effectuated), Faraday rotators, or electro-optic diffraction gratings. Such devices present operational limitations when size and weight must be minimized. Conventional beam steering techniques consume electrical power and require multiple heads to cover a 360-degree ($2\pi$) azimuth field. Many such beam controllers employ optical fiber solely as a conduit to transport a modulated carrier from a laser to a beam steering head.

SUMMARY

A new class of optical beam steering devices offers unique features as components of free space optical (FSO) communication networks. These fiber optic beam steering (FOBS) devices are relatively small, lightweight, and use no local power or moving parts at the beam steering head. The devices employ specially-designed blazed fiber Bragg gratings (BFBGs) and, through selective mechanical or wavelength tuning, convert guided modes to radiation modes.

Disclosed is an optical beam steering system having a plurality of serially concatenated optical apertures arranged in a circle. Each of the optical apertures corresponds to a unique angular sector of the circle and includes a blazed fiber Bragg grating that responds to selected wavelengths of light. Each particular sector of the optical system can be made to project a radially directed light beam based upon the light used. The direction of the light projecting from a chosen sector can be altered by further wavelength tuning the light and can also be changed by expanding or contracting the length of the blazed fiber Bragg grating employed.

The blazed fiber Bragg gratings radiate beams of light that can be swept in arcs around a circular fiber arrangement. The light is projected from a side of the optical fiber so that a narrow beam of modulated light is directed to a specified point in space.

Other objects, advantages and new features of the invention will become apparent from the following detailed description of the invention when considered in conjunction with the accompanied drawings.

BRIEF DESCRIPTION OF THE DRAWINGS

FIG. 1A depicts a representative coiled optical Bragg radiating aperture system wherein

DESCRIPTION

Figure 1A:
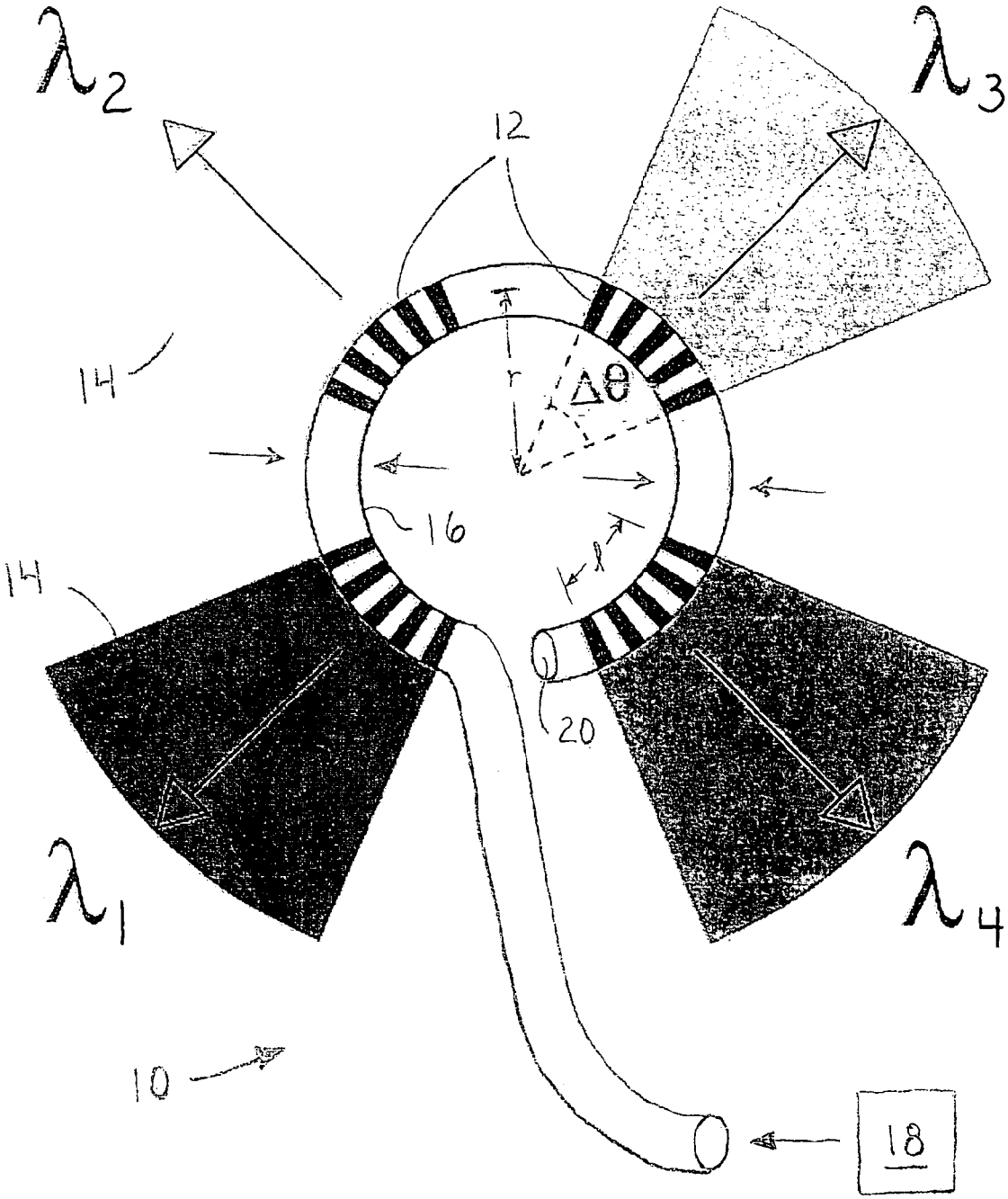

Referring to FIG. 1A, an example coiled optical Bragg radiating aperture (COBRA) system 10 is illustrated. System 10 includes a plurality of blazed, fiber Bragg gratings 12 that are each broadband optical apertures (BOAs), that, in an exemplary embodiment, may be written in series into the fiber core of a single optical fiber bent to form a circle as shown in FIG. 1A. An alternate arrangement is to employ individual fibers for each of the BOAs. Each BOA 12 corresponds to a unique angular sector 14 of circle 16 and is designed to radially project or radiate light into a specific azimuth of the circle. Which BOA 12, and hence azimuth of the circle, is chosen to be utilized is made possible by user selection. The BOAs 12 are designed to respond to selected wavelengths of light transmitted to them, and allow a specific wavelength of light, for example, $\lambda 1$, etc. to be radiated from a chosen sector of circle 16. A particular BOA is accessed by changing the wavelength of light launched into COBRA system 10.

As can be seen in FIG. 1A, a multi-wavelength light source 18 provides light to BOAs 12. This light can be provided either directly or via a fiber conduit (not shown). Terminated end 20 of the fiber can be sent to another COBRA system, coupled to a light trap wherein the remaining light is absorbed or could be terminated so as to reflect any unused light back through COBRA system 10, for example.

The individual BOAs 12 of system 10 can be activated by tuning the wavelength of transmitter 18. By providing different wavelengths that are spaced sufficiently apart and that have small linewidths that do not overlap, it is possible to activate the BOAs independently from each other. Transmitter 18 can send modulated data, and can be a single tunable laser source or a set of lasers each of different wavelengths, in both cases coupled to system 10 via optical fibers. Once a radiated beam is emitted from a BOA, the radiated beam can be steered in space by tuning the transmitter wavelength or by placing strain on the fiber (shown by small arrows in the figure) as performed by an expandable and contractible mandrel.

Figure 1B:
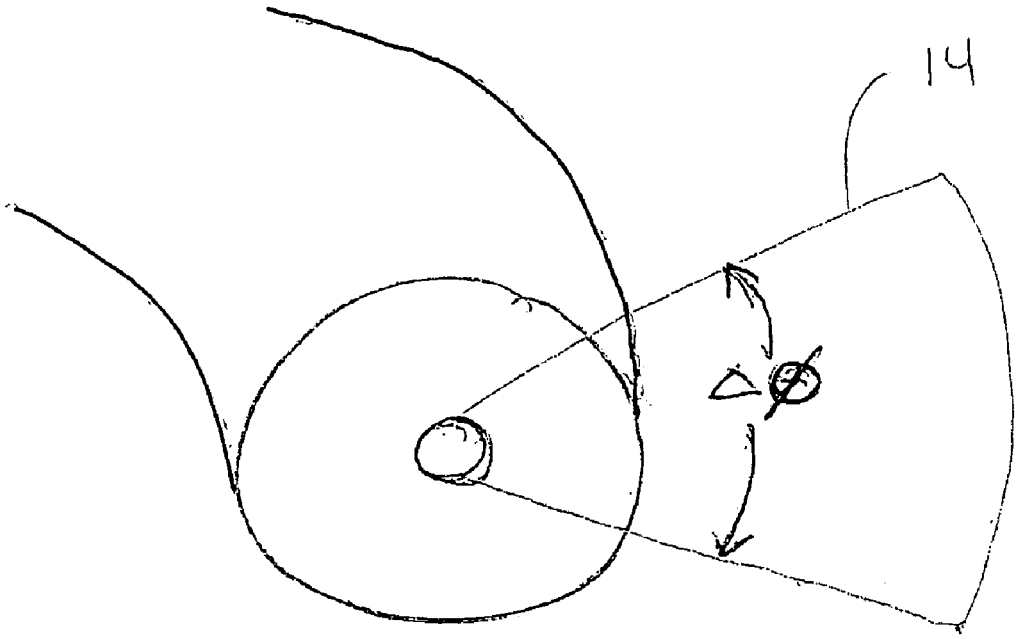
FIG. 1B shows a cross-section of this system.

Each BOA employs features of fiber Bragg gratings (FBGs) that are common in optical telecommunications and sensors. Device operation is governed by the fundamental equation for Bragg diffraction of an incident fiber guided mode:

$$m\lambda = d(1+\sin\Phi) \quad [1]$$

where m=0, 1, 2, 3, . . . are the Bragg diffraction orders, $\lambda$ is the wavelength of light in the fiber medium, d is the periodic grating spacing of the index modulation in the fiber core, and $\Phi$ is the exit angle of the radiated mode as illustrated in FIG. 1B ($\Phi$=0 is normal to the fiber longitudinal axis).

Most common applications of fiber Bragg gratings (FBG) employ normal incident gratings ($\Phi$=90°) of spacing $d=\lambda/2$. These devices work well as narrow band filters, reflectors, dispersion compensators and sensors. Emphasis in these grating designs is placed on conserving the guided mode while minimizing radiative losses from the fiber core.

In contrast, the BOA of system 10 optimizes radiation modes by providing an operational grating space region of $0.8\lambda<d<1.2\lambda$. The Bragg diffraction equation shows that the radiation exit angle, $\Phi$, can be steered by tuning the grating spacing, d, or wavelength $\lambda$. It is possible to tune d by fiber strain. Changing $\lambda$ is done by direct transmitter wavelength tuning wherein a specific wavelength of light from any of the wavelengths that the BOA is responsive to is selected to effectuate steering of the radiated beam. Depending on the orientation of COBRA system 10 (typically horizontal), radius and BOA array count, radiated beam patterns can be designed to be diffraction limited to narrow divergence ($10^{-3}$ degrees) in the plane of the fiber (azimuth $\Delta\theta$) and less than 10° in elevation ($\Delta\Phi$).

Figure 2:
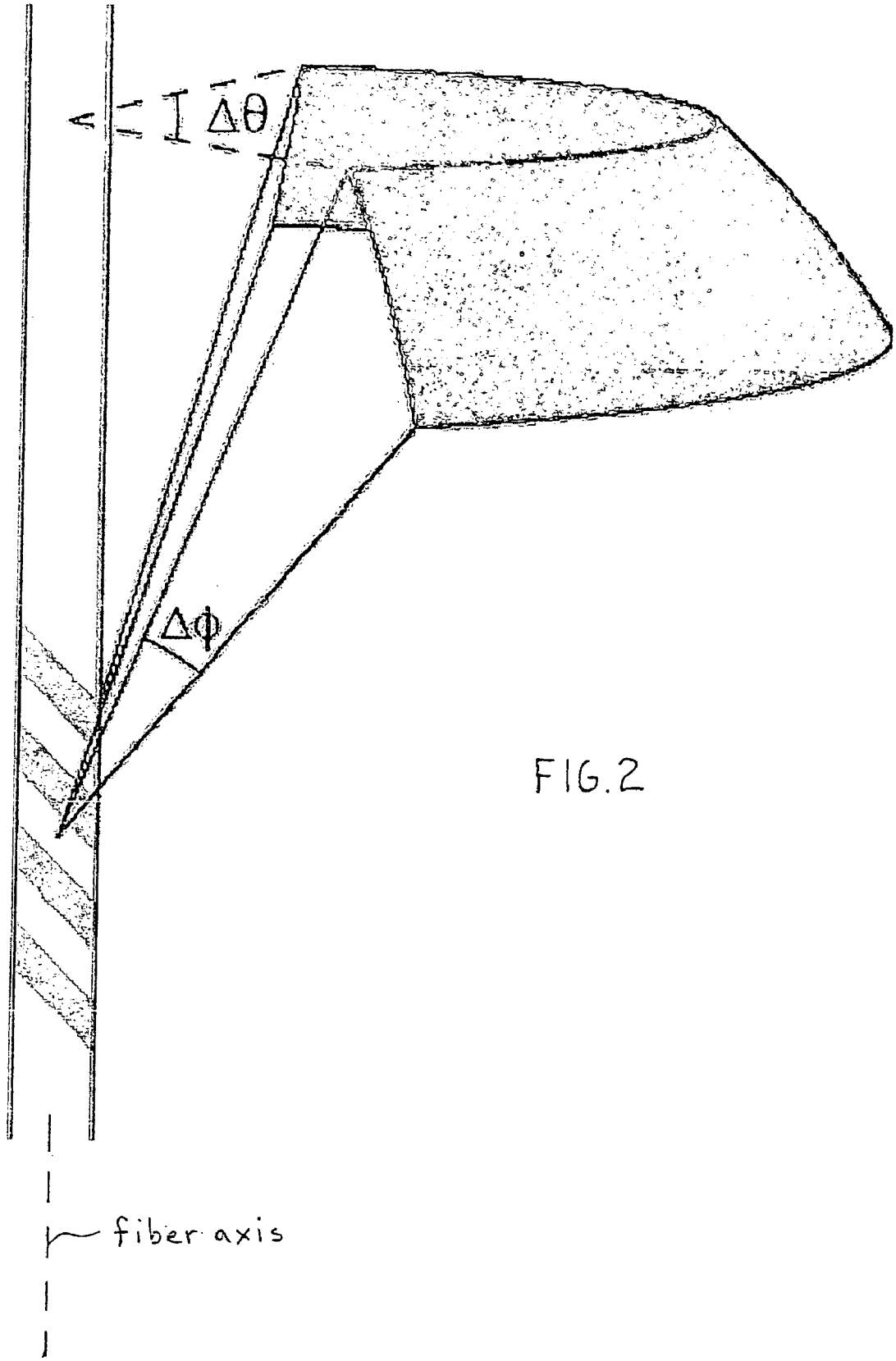
FIG. 2 shows exemplary beam shape of an optical aperture.

Referring to FIG. 2, the case of a single BOA that is oriented vertically and that has no curvature along its longitudinal axis is shown. For such a configuration, the BOA emits a fixed beam roughly 10° (175 milli-radians) wide in azimuth ($\Delta\theta$). This divergence is set by the BOA element function based on optical diffraction of a small aperture. For a single mode fiber, this optical aperture is roughly 10-μm diameter, for example. The elevation divergence is very narrow and diffraction limited by the grating length (array function). For example, from a 20-mm long BOA grating, the elevation divergence is approximately $3\times10^{-3}$ degrees (50 micro-radians). As such, a substantially straight BOA emits a highly directional beam with 63-dB gain. In comparison, an isotropic radiator experiences a 0 dB gain. The elevation plane of the exiting beam can be steered over a practical range of approximately +/−5° using longitudinal fiber strain or by optical wavelength tuning.

When an array of BOAs are shaped as in COBRA system 10, the sector beam divergence is dependent on the COBRA radius of curvature, the number of BOA elements, and the arc length (l) of each BOA. For example, if the COBRA plane is aligned horizontally and thirty six BOA elements are used to cover a full $2\pi$ azimuth, then the azimuth divergence is $2\pi/36$ or about 10° (175 milli-radians) and the elevation divergence is now set by the element function to be also about 10° (175 milli-radians). In this configuration, the sector beam divergence has a gain of about 26 dB. In either a straight or curved BOA configuration, the communications bandwidth of the BOA is set by the transit time response along the grating length and is equal to about 3.5 GHz for a 20-mm long BOA grating.

Figure 3:
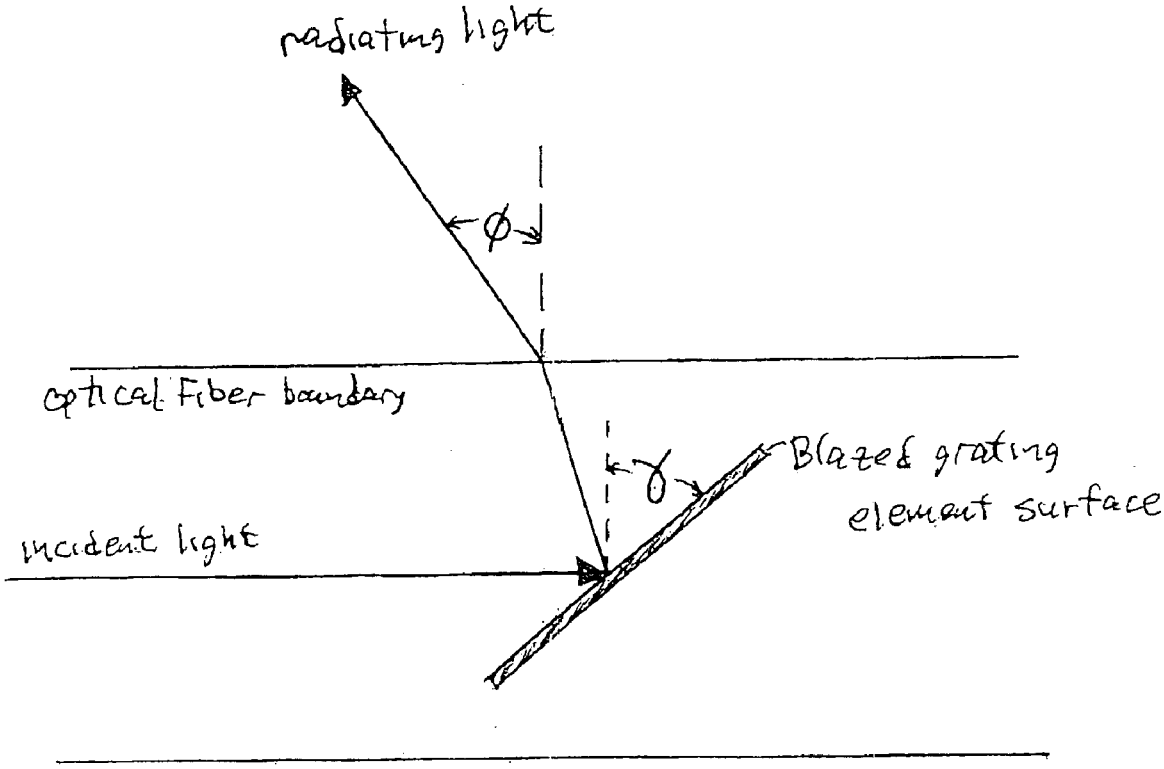
FIG. 3 illustrates the relationship between radiation exit angle and grating blaze angle.

In COBRA system 10, BOAs 12 are designed to use the fundamental diffraction order (m=1). In each BOA, the FBGs are specifically blazed to optimize radiation efficiency and to direct the azimuthal radiation into a narrow, element-function dependent beam. This blaze angle is precisely calculated and applied to the grating to provide optimum radiation efficiency for the fiber type, wavelength and grating period used. Referring to FIG. 3, optimization of the blaze angle is calculated according to equation [1a], wherein the relationship between the radiation exit angle, $\Phi$, and the optimum blaze angle $\gamma$, is expressed as $$n_{cr}\cos 2\gamma = n_f \sin\Phi \qquad [1a]$$

where $n_{cr}$ is the refractive index in the fiber, $n_f$ is the refractive index outside the fiber, $\Phi$ is the radiation exit angle and $\gamma$ is the grating blaze angle.

In general, the optical performance of a BOA can be described by its radiation efficiency, $\eta$, grating strength or attenuation coefficient, $\alpha$, and length, $l_{grat}$. The grating radiation efficiency is a function of both the grating strength and length and can be expressed as $$\eta = 1 - \exp(-\alpha l_{grat}). \qquad [2]$$

Figure 4:
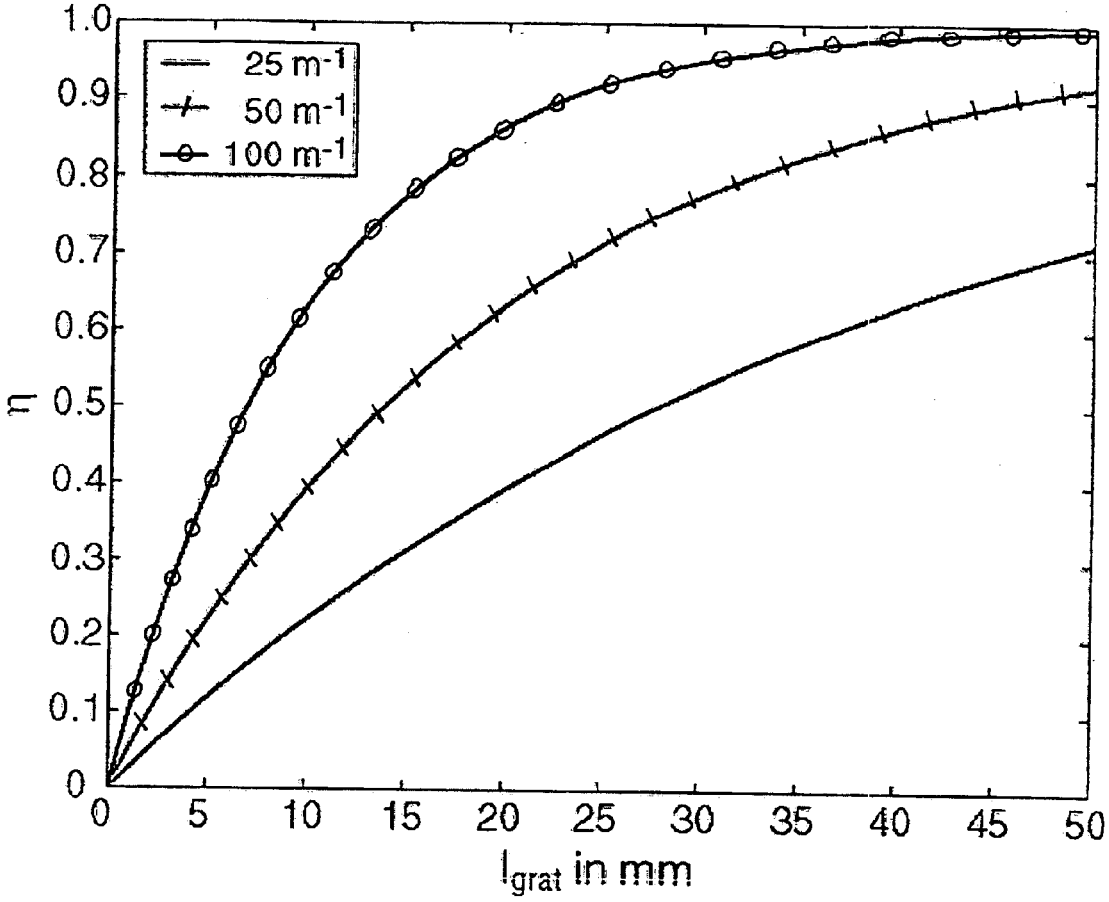
FIG. 4 illustrates exemplary radiation efficiency versus grating length.

FIG. 4 is a plot of example radiation efficiency vs. grating length for gratings with different attenuation coefficients. As seen, for a 20-mm long grating with an attenuation coefficient of 100 $m^{-1}$, the radiation efficiency is about 85%.

Equation 2 is solved to yield expressions for the grating attenuation coefficient and length:

$$\alpha = -\frac{1}{l_{grat}}\ln[1-\eta] \qquad [3]$$

$$l_{grat} = -\frac{1}{\alpha}\ln[1-\eta]. \qquad [4]$$

Equations [3] and [4] are then respectively used to determine the grating strength needed to radiate a specified fraction of power over a specified length, or to determine the necessary grating length to radiate a specified fraction of power for a given attenuation coefficient.

As previously described for a straight configured BOA, characteristics of the beam shape are such that the light radiated out of the BOA forms a beam that sweeps out an arc ($\Delta\theta$) around the fiber axis as shown in FIG. 2. This arc leaves the fiber at an exit angle, $\Phi$, measured from the normal to the fiber axis. There is an angular spread $\Delta\Phi$ centered about this exit angle due to diffraction and dispersion and an angular spread of $\Delta\theta$ about the azimuth of the fiber. As previously described, the $\Delta\theta$ has been experimentally determined to be about 10° (0.1745 radians) and is dependent on the grating element function.

The BOA beam exit angle $\Phi$ with respect to the normal to the fiber is expressed as $$\phi = \arcsin\left(\frac{m\lambda_0}{d} - n_{eff}\right) \qquad [5]$$

where m is the diffraction order, $\lambda_0$ is the free-space wavelength, d is the grating spacing, and $n_{eff}$ is the effective refractive index of the mode within the fiber. This equation is derived from the fundamental Bragg grating equation, equation [1], and takes into consideration a glass-air interface at the cladding-air boundary. This equation shows that $\Phi$ depends on wavelength. Thus, a spread in the input wavelength spectrum incident on the grating results in a spread in the exit angular spectrum. The BOA device essentially converts frequency (wavelength) spectra into spatial (angular) spectra. The BOA device performs an optical Fourier transform. As such, if the input wavelength to the BOA is tuned, the beam exit angle $\Phi$ is steered.

Diffraction is also wavelength dependent, so for a given linewidth each individual wavelength will experience a unique exit angle and will have a unique diffractive divergence. A simple way to model the diffraction is to approximate the BOA as a rectangular aperture. To first order, the diffraction along the length and the width of the grating can be treated as a slit with aperture lengths $l_{grat}$ and 2a, respectively, where a is the core radius of the fiber.

Ignoring side lobes, the diffraction angle to the first order destructive interference node is given by $$\phi_{diff} = \arcsin\left(\frac{\lambda_0}{l_{aperture}}\right). \qquad [6]$$

Figure 5:
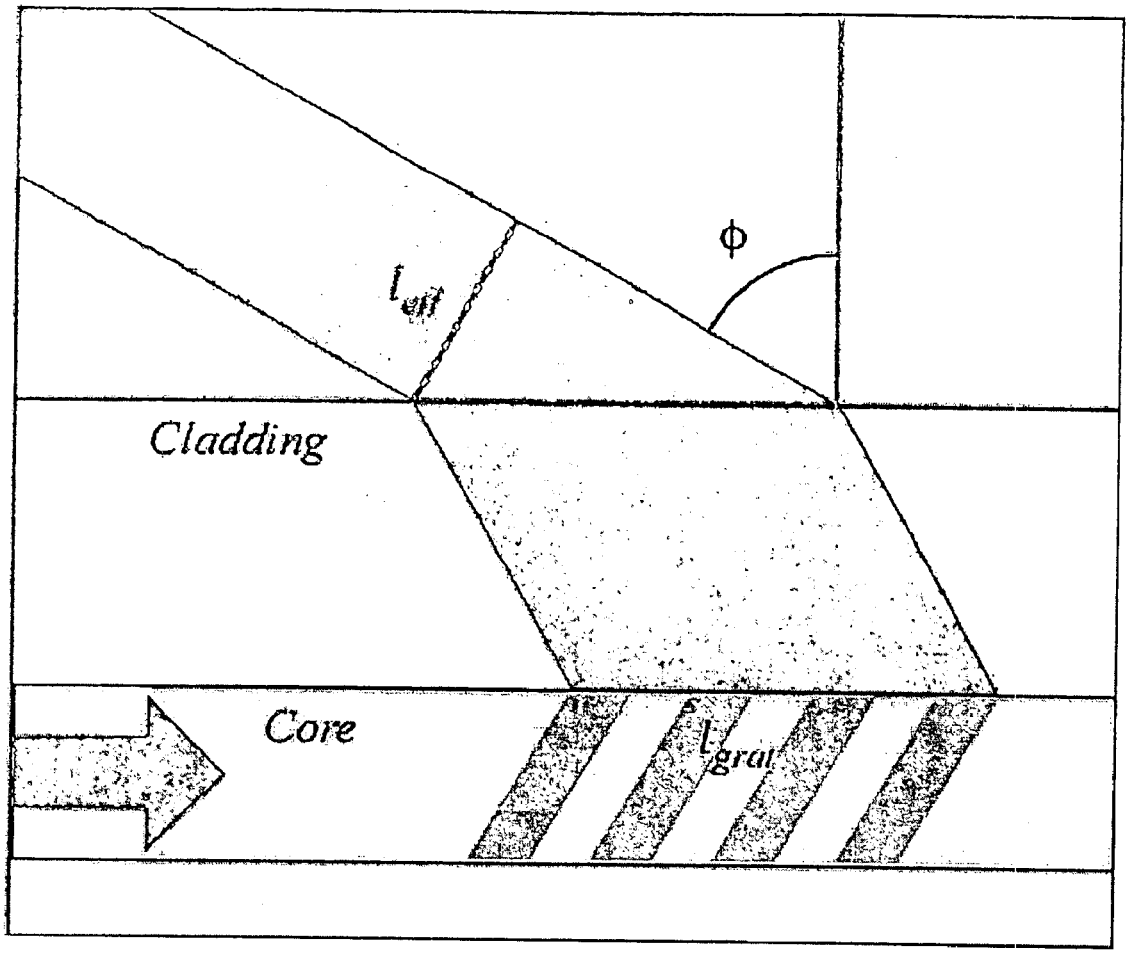
FIG. 5 depicts representative effective aperture length.

The aperture length, $l_{aperture}$, used to model the BOA is an effective grating length that is dependent on the exit angle of the beam and therefore dependent on wavelength. The effective grating length is depicted in FIG. 5. It is given by $$l_{eff} = l_{grat}\cos(\phi) = l_{grat}\cos\left(\arcsin\left(\frac{m\lambda_0}{d} - n_{eff}\right)\right). \quad [7]$$

The total angular spread for an individual wavelength due to diffraction is $$\Delta\phi_{diff} = 2\arcsin\left(\frac{\lambda_0}{l_{eff}}\right). \quad [8]$$

For any linewidth, each individual wavelength has a specific angular spread about a unique angle. The angles covered are $$\phi_{\max}(\lambda) = \phi_{exit}(\lambda) + \frac{(\Delta\phi_{diff})}{2}, \quad [9]$$

and, $$\phi_{\min}(\lambda) = \phi_{exit}(\lambda) - \frac{(\Delta\phi_{diff})}{2}. \quad [10]$$

For communications, it is important to calculate the total beam area arriving at a receiver detector surface located at a distance R from the transmitting aperture. To calculate this beam area, $A_{beam}$, for the beam radiated from the BOA, $\Phi_{min}$ and $\Phi_{max}$ are calculated for all wavelengths within the linewidth. Of all these angles, the largest and smallest will define the beam spread. This analysis assigns the largest angle to $\Phi_2$ and the smallest to $\Phi_1$. $A_{beam}$ can now be calculated performing a surface area integral using spherical coordinates with the azimuth located along the axis of the fiber and the origin at the center of the grating.

$$A_{beam} = \int_0^{\Delta\theta}\int_{\phi_1}^{\phi_2} R^2\sin(\phi)\partial\phi\partial\theta, \quad [11]$$

after evaluating the integral $$A_{beam}=R^2(\Delta\theta)[\cos(\theta_{min})-\cos(\theta_{max})]. \quad [12]$$

NOTE: This calculation does not contain information about power distribution within $A_{beam}$ and assumes it is uniform. It is common to compare the beam divergence to that of an isotropic radiator. This is called the directivity of the radiator. The directivity of the exiting beam is $$D = \frac{4\pi}{(\Delta\theta)[\cos(\phi_{\min}) - \cos(\phi_{\max})]} \approx \frac{4\pi}{\Delta\theta\Delta\phi}, \quad [13]$$

where $$\Delta\Phi=\Phi_{max}-\Phi_{min}. \quad [14]$$

In dB, the directivity or gain compared to an isotropic radiator is $$D_{tx}=10\log(D). \quad [15]$$

For communications applications, it is important to evaluate the bandwidth performance of each component in the system. Using the standard relationship between 3-dB electrical bandwidth and risetime, the bandwidth ($BW_{device}$) of a BOA device is $$BW_{BFBG} = \frac{0.35}{t_{rise}}, \quad [16]$$

where $t_{rise}$ is the rise time of the BOA. The rise time can be derived as follows. The radiation efficiency equation, equation [2], can be rewritten into equation [4] and [17] to give the grating length as a function of grating strength, α, and radiation efficiency, η, $$l_{grat} = -\frac{1}{\alpha}\ln(1-\eta). \quad [17]$$

Knowing the propagation time of light in a dielectric medium, equation [17] can be converted into a function of time by making the following substitution $$l_{grat} = \frac{c_0 t_{grat}}{\eta_{eff}}, \quad [18]$$

where $t_{grat}$ is the propagation time it takes an infinitesimally short pulse of light to traverse the length of the grating. Combing equations [17] and [18], the grating propagation time is then expressed as a function of the grating strength and grating radiation efficiency $$t_{grat} = -\frac{\eta_{eff}}{\alpha c_0}\ln(1-\eta). \quad [19]$$

To derive bandwidth, the propagation time is next related to rise time. Employing the standard rise time definition, the rise time of the grating is defined as being from the time it takes to radiate 10% of the pulse power to the time it takes to radiate 90%, $$t_{rise}=t_{grat}(0.9\,\eta)-t_{grat}(0.1\,\eta). \quad [20]$$

Figure 7:
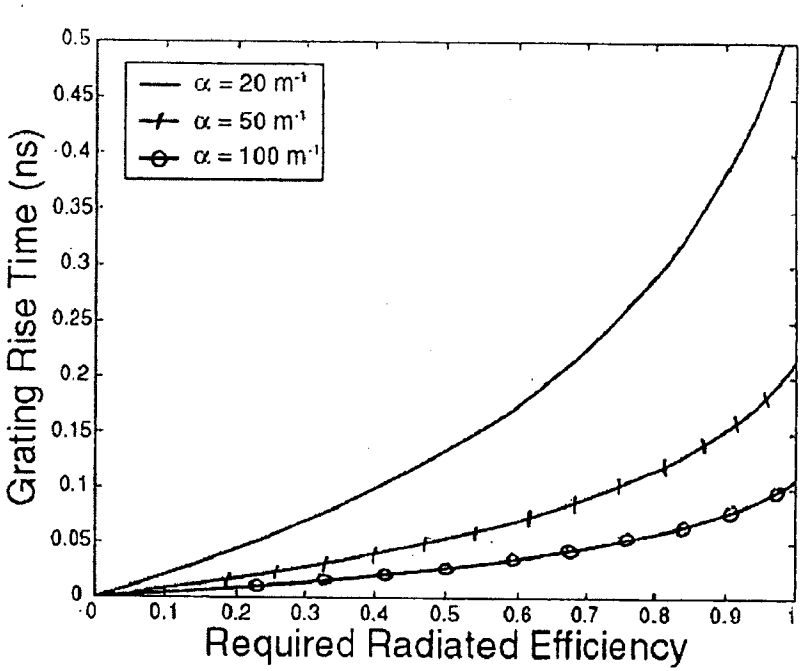
FIG. 7 shows example grating rise time versus required radiation efficiency.
Figure 6:
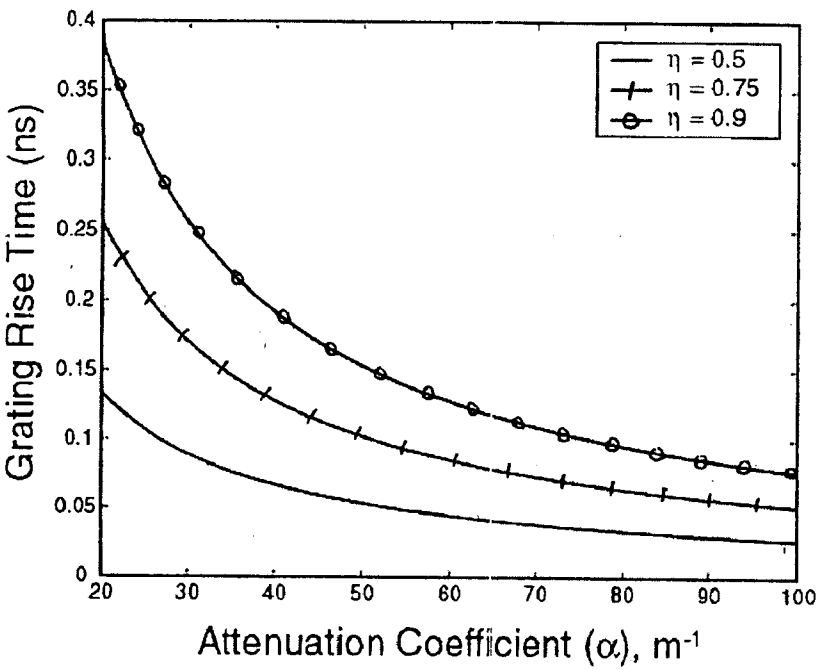
FIG. 6 shows example grating rise time versus attenuation coefficient.

Substituting equation [19], the grating risetime can be written as $$t_{rise} = -\frac{\eta_{eff}}{\alpha c_0}\ln\left(\frac{1-0.9\eta}{1-0.1\eta}\right), \quad [21]$$

where η is the fraction of power required to radiate from the grating. FIGS. 6 and 7 depict the grating rise time vs. attenuation coefficient and required radiation efficiency, respectively. As stated above from equation [16], the BOA bandwidth is $$BW_{BFBG} = \frac{0.35}{t_{rise}}. \quad [22]$$

Figure 9:
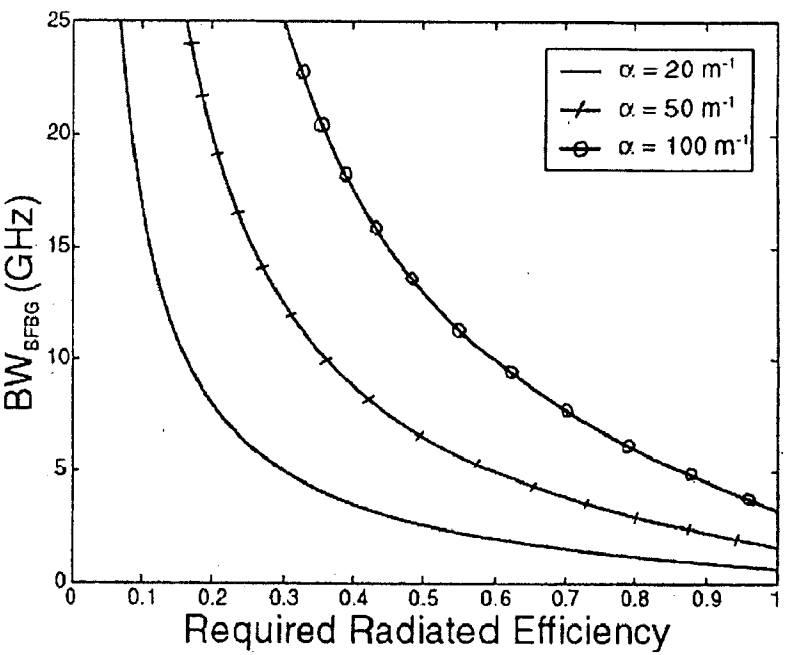
FIG. 9 is a graphical depiction of an exemplary blazed fiber Bragg grating bandwidth versus required radiation efficiency.
Figure 8:
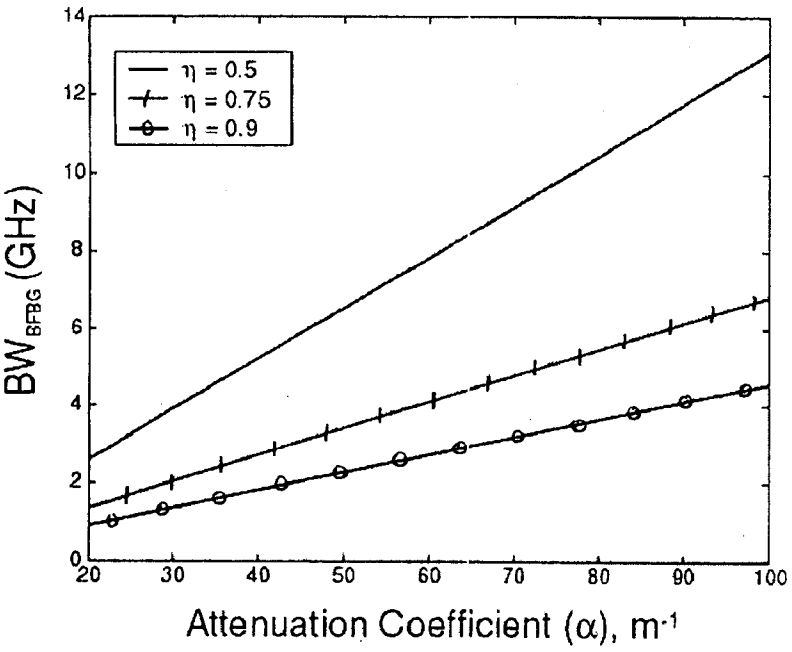
FIG. 8 depicts graphically an example blazed fiber Bragg grating bandwidth versus attenuation coefficient.

FIGS. 8 and 9 show the effects of different attenuation coefficients and required radiation efficiencies on device bandwidth, respectively. It is seen that greater than 10 GHz bandwidth can be expected from a device with a radiation efficiency of 50 percent and attenuation coefficient of 100 $m^{-1}$. This applies to BOAs that are configured either straight or curved since the bandwidth is dependent on grating length and efficiency.

For all but very large radii, the circular shape of the BOAs outweighs any effects of diffraction caused by the length of the BOA grating. For this reason, the angle subtended by the radiated beam is also the angle subtended by the grating about the circle formed by the bent fiber. This angle can be expressed as $$\Delta\theta_{grat} = \frac{l_{grat}}{r} \quad [23]$$

where $l_{grat}$ is the grating length and r is the radius of the fiber circle (center of fiber circle to center of fiber core). The projected beam area is found with spherical coordinates where the azimuth passes through the center of the fiber circle perpendicular to the plane of the circle. With the coordinate system arranged in this way the beam area is given by $$A_{beam} = R^2\left(\frac{l_{grat}}{r}\right)\left[\cos\left(\frac{\pi}{2} - \Delta\phi\right) - \cos\left(\frac{\pi}{2} + \Delta\phi\right)\right] \quad [24]$$

where R is the distance from the center of the COBRA circle to an optical receiver and ΔΦ is the arc angle in elevation (with COBRA system 10 oriented horizontally) that the beam makes about the axis of the fiber. As mentioned above, this has been measured to be about 10°. (The true distance from the grating to the receiver target is R−r where r is the radius of the fiber circle. Typically R>>r, so the radius term has been neglected in the first term of the equation above.)

As mentioned above, bending the fiber introduces a large angular spread in the beam. It is much larger than the spreading effects due to dispersion and diffraction in an unbent BOA device. A COBRA system with a grating length of 2.5 cm and device radius of 25 cm has a directivity of 28.5 dB. (dispersion and diffraction are ignored in this calculation.) An unbent grating of the same length has a directivity of 43.1 dB. This calculation includes the effects of diffraction and dispersion where the transmitter linewidth is 10 nm centered about 1550 nm. When used for a communications transmitter beam, spread loss at a distance of 10 km for the COBRA and unbent BOA grating are −89.1 dB and −74.5 dB, respectively.

The device bandwidth for the COBRA is the same as for a BOA, but the maximum possible free space optical receiver bandwidth would be much less because of the increased spread loss from the relatively high divergence of a compact 25-cm radius COBRA system. To have the directivity and spread loss of the COBRA be comparable to an unbent BOA grating, the COBRA system radius would have to be ~7 meters. (dispersion and diffraction would no longer be negligible and would need to be worked into the model.)

Obviously, many modifications and variations of the invention are possible in light of the above description. It is therefore to be understood that within the scope of the appended claims, the invention may be practiced otherwise than as has been specifically described.

What is claimed is:

1. An optical apparatus comprising:

a plurality of optical apertures arranged in a circle, wherein each of said optical apertures corresponds to a unique sector of said circle and includes a blazed fiber Bragg grating that responds to selected wavelengths of light by radiating a radially directed light beam, said light beam being directable according to a specific wavelength of light chosen from said selected wavelengths of light; and a source of multi-wavelength light operably coupled to said plurality of optical apertures.

2. The optical apparatus of claim 1 wherein each of said blazed fiber Bragg gratings are governed by the relation:

$$m\lambda = d(1+\sin\Phi)$$

where m=a whole number Bragg diffraction order, λ=wavelength of light in the fiber, d=a periodic grating spacing of index modulation in a core of the fiber, and Φ is an exit angle of said radiated light beam wherein Φ=0 is normal to a longitudinal axis of said fiber and further wherein said grating spacing d falls within a region $0.8\lambda<d<1.2\lambda$.

3. The optical apparatus of claim 2 wherein said diffraction order is the fundamental m=1.

4. The optical apparatus of claim 1 wherein said light beam is directable by expanding or contracting a radius of said blazed fiber Bragg grating.

5. The optical apparatus of claim 1 wherein said source of multi-wavelength light includes a laser.

6. The optical apparatus of claim 5 wherein said laser is one of a plurality of lasers.

7. An optical beam steering apparatus comprising:

a plurality of serially concatenated optical apertures arranged in a circle, wherein each of said optical apertures corresponds to a unique angular sector of said circle and includes a blazed fiber Bragg grating that responds to selected wavelengths of light by radiating a radially directed light beam, said light beam being directable according to a specific wavelength of light chosen from said selected wavelengths of light; and a source of multi-wavelength light operably coupled to said plurality of optical apertures.

8. The optical beam steering apparatus of claim 7 wherein each of said blazed fiber Bragg gratings are governed by the relation:

$$m\lambda = d(1+\sin\Phi)$$

where m=a whole number Bragg diffraction order, λ=wavelength of light in the fiber, d=a periodic grating spacing of index modulation in a core of the fiber, and Φ is an exit angle of said radiated light beam wherein Φ=0 is normal to a longitudinal axis of said fiber and further wherein said grating spacing d falls with a region $0.8\lambda<d<1.2\lambda$.

9. The optical beam steering apparatus of claim 8 wherein said diffraction order is the fundamental m=1.

10. The optical beam steering apparatus of claim 7 wherein said light beam is directable by expanding or contracting a radius of said blazed fiber Bragg grating.

11. The optical beam steering apparatus of claim 7 wherein said source of multi-wavelength light includes a laser.

12. The optical beam steering apparatus of claim 11 wherein said laser is one of a plurality of lasers.

13. An optical beam steering apparatus comprising:

a plurality of serially concatenated optical apertures arranged in a circle, wherein each of said optical apertures corresponds to a unique sector of said circle and includes a blazed fiber Bragg grating that responds to selected wavelengths of light by radiating a radially directed light beam, said light beam being directable according to a specific wavelength of light chosen from said selected wavelengths of light and by expanding and contracting a radius of said blazed fiber Bragg grating; and a source of multi-wavelength light operably coupled to said plurality of optical apertures.

14. The optical beam steering apparatus of claim 13 wherein each of said blazed fiber Bragg gratings are governed by the relation:

$$m\lambda = d(1+\sin\Phi)$$

where m=a whole number Bragg diffraction order, λ=wavelength of light in the fiber, d=a periodic grating spacing of index modulation in a core of the fiber, and Φ=is an exit angle of said radiated light beam wherein Φ=0 is normal to a longitudinal axis of said fiber and further wherein said grating spacing d falls with a region $0.8\lambda<d<1.2\lambda$.

15. The optical beam steering apparatus of claim 14 wherein said diffraction order is the fundamental m=1.

16. The optical beam steering apparatus of claim 13 wherein said source of multi-wavelength light includes a laser.

17. The optical beam steering apparatus of claim 16 wherein said laser is one of a plurality of lasers.

* * * * *